(12) United States Patent
Gerard et al.

(10) Patent No.: US 10,876,004 B2
(45) Date of Patent: Dec. 29, 2020

(54) PROCESS FOR PREPARING SURFACE-REACTED CALCIUM CARBONATE

(71) Applicant: Omya International AG, Oftringen (CH)

(72) Inventors: Daniel E. Gerard, Basel (CH); Patrick A. C. Gane, Rothrist (CH); Joachim Schoelkopf, Oberkulm (CH)

(73) Assignee: Omya International AG, Oftringen (CH)

( * ) Notice: Subject to any disclaimer, the term of this patent is extended or adjusted under 35 U.S.C. 154(b) by 13 days.

(21) Appl. No.: 16/308,627

(22) PCT Filed: Jul. 21, 2017

(86) PCT No.: PCT/EP2017/068449
§ 371 (c)(1),
(2) Date: Dec. 10, 2018

(87) PCT Pub. No.: WO2018/019710
PCT Pub. Date: Feb. 1, 2018

(65) Prior Publication Data
US 2019/0270890 A1    Sep. 5, 2019

(30) Foreign Application Priority Data

Jul. 25, 2016 (EP) ..................... 16181094

(51) Int. Cl.
*B01J 20/32* (2006.01)
*B01J 20/30* (2006.01)
*C09C 1/02* (2006.01)

(52) U.S. Cl.
CPC .......... *C09C 1/021* (2013.01); *C01P 2006/12* (2013.01); *C01P 2006/14* (2013.01)

(58) Field of Classification Search
None
See application file for complete search history.

(56) References Cited

U.S. PATENT DOCUMENTS

| 4,219,590 A | 8/1980 | Shibazaki et al. |
| 5,043,017 A | 8/1991 | Passaretti |

(Continued)

FOREIGN PATENT DOCUMENTS

| EP | 1 712 523 A1 | 10/2006 |
| EP | 1 712 597 A1 | 10/2006 |

(Continued)

OTHER PUBLICATIONS

The International Search Report dated Aug. 25, 2017 from PCT/EP2017/068449.

(Continued)

*Primary Examiner* — Daniel Berns
(74) *Attorney, Agent, or Firm* — Fay Sharpe LLP (57) ABSTRACT

The present invention relates to a process for producing surface-reacted calcium carbonate, wherein a calcium carbonate-comprising material is treated with phosphoric acid, carbon dioxide, and specific dicarboxylic acids, in an aqueous medium to form an aqueous suspension of surface-reacted calcium carbonate. Furthermore, the present invention relates to surface-reacted calcium carbonate obtained by said process and its use.

25 Claims, 1 Drawing Sheet

(56) References Cited

U.S. PATENT DOCUMENTS

| | | | |
|---|---|---|---|
| 5,584,923 A | 12/1996 | Wu | |
| 5,647,902 A | 7/1997 | Wu | |
| 5,711,799 A | 1/1998 | Snowden et al. | |
| 6,666,953 B1 | 12/2003 | Gane et al. | |

FOREIGN PATENT DOCUMENTS

| | | | |
|---|---|---|---|
| EP | 2 264 109 A1 | 12/2010 | |
| EP | 2 371 766 A1 | 10/2011 | |
| EP | 2 447 213 A1 | 5/2012 | |
| EP | 2 524 898 A1 | 11/2012 | |
| EP | 2 957 603 A1 | 12/2015 | |
| EP | 3045503 A1 * | 7/2016 | ............... A61K 8/19 |
| WO | 97/08247 A1 | 3/1997 | |
| WO | 97/146541 A1 | 4/1997 | |
| WO | 98/20079 A1 | 5/1998 | |
| WO | 99/02608 A1 | 1/1999 | |
| WO | 2004/083316 A1 | 9/2004 | |
| WO | 2005/121257 A2 | 12/2005 | |
| WO | 2013/142473 A1 | 9/2013 | |

OTHER PUBLICATIONS

The Written Opinion of the International Searching Authority dated Aug. 25, 2017 from PCT/EP2017/068449.
Wilkins et al., "The Effect of Surface Pretreatment with Polymaleic Acid, Phosphoric Acid, or Oxalic Acid on the Dissolution Kinetics of Calcium Carbonate in Aqueous Acid", Journal of Colloid and Interface Science 242, pp. 378-385 (2001).

* cited by examiner

PROCESS FOR PREPARING SURFACE-REACTED CALCIUM CARBONATE

CROSS-REFERENCE TO RELATED APPLICATIONS

This is a U.S. national phase of PCT Application No. PCT/EP2017/068449, filed Jul. 21, 2017, which claims priority to European Application No. 16181094.0, filed Jul. 25, 2016.

The present invention relates to a process for preparing surface-reacted calcium carbonate, a surface-reacted calcium carbonate obtained by said process and its use as well as the use of a process for adjusting the BET surface area.

In practice, calcium carbonate is used in huge quantities in the paper, paint, rubber and plastics industries for various purposes such as coatings, fillers, extenders and pigments for papermaking as well as aqueous lacquers and paints and in water treatment, and notably as a means of removing inorganic materials such as heavy metals and/or pharmaceutical waste such as polycyclic compounds, cholesterol and/or endocrine disrupting compounds (EDC).

With respect to precluding aggregation of calcium carbonate particles and enhancing the affinity of these particles with a substance to which the particles are being added, for example as a filler or flocculating agent, the physical and chemical properties of the surfaces of such calcium carbonate particles are amended by treating the calcium carbonate with fatty acid or a sodium salt of a fatty acid, resin acid or other acids.

In the art, several approaches for improving the chemical and physical properties of calcium carbonate have been proposed. For example, U.S. Pat. No. 4,219,590 A describes a method for improving calcium carbonate by causing calcium carbonate particles to undergo contact reaction with an acid gas capable of reacting with calcium carbonate to render the particle size approximating to finely monodisperse and, at the same time, coating the surface of the calcium carbonate particles with the calcium salt of the acid of the acid gas. U.S. Pat. No. 6,666,953 B1 relates to a pigment, filler or mineral containing a natural calcium carbonate, treated with one of more providers of $H_3O^+$ ions and gaseous $CO_2$, allowing a reduction in the weight of paper for a constant surface area without loss of physical properties when it is used as a pigment or coating filler for said paper. WO 99/02608 A1 describes a method of producing a high solids slurry of an acid-resistant precipitated calcium carbonate, wherein a solids slurry is treated with a chemical additive, such as sodium aluminate, in order to impart acid resistance to the calcium carbonate.

Additionally, U.S. Pat. Nos. 5,584,923 A, 5,647,902 A, 5,711,799 A, WO 97/08247 A1 and WO 98/20079 A1, respectively, describe calcium carbonate which is acid-resistant to enable its use as a filler material in the making of neutral to weakly acidic paper, and a process for producing this acid-resistant calcium carbonate.

Furthermore, WO 2005/121257 A2 discloses a method for producing a dry mineral pigment characterized in that it contains a product formed in situ by the multiple reaction of a calcium carbonate and with the reaction product or products of said carbonate with gaseous $CO_2$ formed in situ and/or from an external supply; and with at least one compound of formula R—X. WO 2004/083316 A1 refers to mineral pigments containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminum silicate and/or at least one synthetic silica and/or at least one calcium silicate and/or at least one silicate of a monovalent salt such as sodium silicate and/or potassium silicate and/or lithium silicate, preferably such as sodium silicate and/or at least one aluminum hydroxide and/or at least one sodium and/or potassium aluminate, used in papermaking applications, such as mass filling and/or paper coating.

U.S. Pat. No. 5,043,017 A relates to calcium carbonate, acid-stabilized by the addition to finely divided calcium carbonate of one of a calcium-chelating agent and a conjugate base, such as sodium hexametaphosphate, followed by the addition of an acid, such as phosphoric acid.

EP 2 264 109 A1 relates to a process for preparing a surface-reacted calcium carbonate, wherein calcium carbonate is treated with at least one acid having a $pK_a$ of less than or equal to 2.5 and at least one water-soluble non-polymeric organic and/or inorganic weak acid and/or a hydrogen salt thereof, wherein the at least one water soluble non-polymeric organic and/or inorganic weak acid has a $pK_a$ of greater than 2.5, and wherein its corresponding acid anion is capable of forming water-insoluble calcium salts.

However, there is still a need in the art on economic methods for preparing high surface area materials allowing for the provision of specific calcium carbonate materials for the desired purpose.

Thus, it would be desirable to have a process available which allows for preparing surface-reacted calcium carbonate and provides the possibility of increasing the specific BET surface area of the calcium carbonate in a predetermined way.

Accordingly, it is an objective of the present invention to provide an economic process for preparing a surface-reacted calcium carbonate, in which the specific BET surface area of the calcium carbonate can be increased in a predetermined way. A further objective of the present invention is the provision of a process for preparing calcium carbonate, in which the specific BET surface area of the calcium carbonate particles is increased by a specific percentage value. Another objective of the present invention is to provide a process, in which the surface-reacted calcium carbonate can be prepared in high yield.

The foregoing and other objects are solved by the subject-matter as defined in the independent claims.

According to one aspect of the present invention, a process for producing a surface-reacted calcium carbonate is provided comprising the steps of:

a) providing an aqueous suspension of calcium carbonate-comprising material,
b) providing phosphoric acid,
c) providing at least one dicarboxylic acid of structural formula (I) or a corresponding salt thereof.

wherein
n is 1, 2 or 3, and
X is —$CH_2$—, —$CHR^a$—, —$CR^aR^b$, or —$CR^a$=$CR^b$ (cis)-, wherein $R^a$ and $R^b$ are independently selected from the group consisting of H, OH, $OR^c$, —$CH_3$, —$CH_2CH_3$, —$CH_2CH_2CH_3$, —$CH(CH_3)_2$, tBu, secBu, and nBu, and wherein $R^c$ is Li, Na, or K, and d) adding the phosphoric acid of step b) to the calcium carbonate-comprising material of step a) over a phosphoric acid addition time period $\Delta t_P$ in the presence of carbon dioxide to form an aqueous suspension of surface-reacted calcium carbonate, wherein the carbon dioxide is formed in-situ by the addition of phosphoric acid and/or is supplied from an external source, and wherein the at least one dicarboxylic acid of step c) is added in step d) during the phosphoric acid addition time period $\Delta t_P$.

According to a further aspect, a surface-reacted calcium carbonate obtainable by a process according to the present invention is provided.

According to still a further aspect, use of a surface-reacted calcium carbonate according to the present invention in polymer applications, paper coating applications, paper making, paints, coatings, sealants, printing inks, adhesives, food, feed, pharmaceuticals, concrete, cement, cosmetics, water treatment, engineered wood applications, plasterboard applications, packaging applications and/or agricultural applications is provided.

According to still a further aspect an article comprising a surface-reacted calcium carbonate according to the present invention is provided, wherein the article is selected from paper products, engineered wood products, plasterboard products, polymer products, hygiene products, medical products, healthcare products, filter products, woven materials, nonwoven materials, geotextile products, agriculture products, horticulture products, clothing, footwear products, baggage products, household products, industrial products, packaging products, building products, and construction products.

Advantageous embodiments of the present invention are defined in the corresponding subclaims.

According to one embodiment in step c) the at least one dicarboxylic acid of structural formula (I) is provided. According to a further embodiment $R^a$ and $R^b$ are independently selected from the group consisting of H and OH.

According to one embodiment the calcium carbonate-comprising material is a natural ground calcium carbonate and/or a precipitated calcium carbonate, preferably the natural ground calcium carbonate is selected from the group consisting of marble, chalk, limestone, and mixtures thereof, and/or the precipitated calcium carbonate is selected from the group consisting of precipitated calcium carbonates having an aragonitic, vateritic or calcitic crystal form, and mixtures thereof. According to a further embodiment the calcium carbonate-comprising material is in form of particles having a weight median particle size $d_{50}$ (wt) from 0.05 to 10 μm, preferably from 0.2 to 5.0 μm, more preferably from 0.4 to 3.0 μm, and most preferably from 0.6 to 1.2 μm, and/or a weight top cut particle size $d_{98}$ (wt) from 0.15 to 55 μm, preferably from 1 to 30 μm, more preferably from 2 to 18 μm, and most preferably from 3 to 7 μm.

According to one embodiment the phosphoric acid is provided in an amount from 1 to 60 wt.-%, based on the total weight of the calcium carbonate-comprising material, preferably from 5 to 55 wt.-%, more preferably from 10 to 50 wt.-%, and most preferably from 20 to 50 wt.-%. According to a further embodiment the at least one carboxylic acid of structural formula (I) is selected from the group consisting of maleic acid, malonic acid, malic acid, tartaric acid, optionally substituted with one or more methyl and/or ethyl groups, and mixtures thereof, and preferably selected from malic acid and/or tartaric acid.

According to one embodiment the at least one dicarboxylic acid or a corresponding salt thereof is provided in an amount from 0.1 to 50 wt.-%, based on the total weight of the calcium carbonate-comprising material, preferably from 0.2 to 25 wt.-%, more preferably from 0.5 to 10 wt.-%, and most preferably from 1 to 5 wt.-%. According to a further embodiment the at least one dicarboxylic acid or a corresponding salt thereof is provided in an amount from 1 to 25 wt.-% based on the total weight of the phosphoric acid, preferably from 3 to 17 wt.-%, more preferably from 6 to 14 wt.-%, and most preferably from 9 to 11 wt.-%.

According to one embodiment the phosphoric acid and the at least one weak carboxylic acid or a corresponding salt thereof are added together in step d) in form of mixture, or the phosphoric acid and the at least one weak carboxylic acid or a corresponding salt thereof are added in step d) simultaneously in form of separate streams. According to a further embodiment the at least one dicarboxylic acid or a corresponding salt thereof is added between the beginning of the phosphoric acid addition time period $\Delta t_P$ at $t_0$ and before 60% of the phosphoric acid addition time period $\Delta t_P$ has elapsed, preferably between the beginning of the phosphoric acid addition time period $\Delta t_P$ at $t_0$ and before 50% of the phosphoric acid addition time period $\Delta t_P$ has elapsed, more preferably between the beginning of the phosphoric acid addition time period $\Delta t_P$ at $t_0$ and before 30% of the phosphoric acid addition time period $\Delta t_P$ has elapsed, even more preferably between the beginning of the phosphoric acid addition time period $\Delta t_P$ at $t_0$ and before 20% of the phosphoric acid addition time period $\Delta t_P$ has elapsed, and most preferably between the beginning of the phosphoric acid addition time period $\Delta t_P$ at $t_0$ and before 10% of the phosphoric acid addition time period $\Delta t_P$ has elapsed.

According to one embodiment the at least one dicarboxylic acid or a corresponding salt thereof is added over a dicarboxylic acid addition time period $\Delta t_{DA}$ and $\Delta t_{DA}$ is from 1 to 20% of the total phosphoric acid addition time period $\Delta t_P$, preferably from 2 to 15%, and more preferably from 3 to 10%. According to a further embodiment step d) is carried out at a temperature from 20 to 90° C., preferably from 30 to 85° C., more preferably from 40 to 80° C., even more preferably from 50 to 75° C., and most preferably from 60 to 70° C. According to still a further embodiment an additional dicarboxylic acid is added during step d), preferably together with the at least one dicarboxylic acid or a corresponding salt thereof. According to still a further embodiment the process further comprises a step e) of separating the surface-reacted calcium carbonate from the aqueous suspension obtained in step d), and optionally a step f) of drying the surface-reacted calcium carbonate.

According to one embodiment the surface-reacted calcium carbonate has a specific surface area (BET) of from 55 $m^2/g$ to 200 $m^2/g$, preferably from 60 $m^2/g$ to 190 $m^2/g$, more preferably from 70 $m^2/g$ to 180 $m^2/g$, even more preferably from 80 $m^2/g$ to 170 $m^2/g$, and most preferably from 100 $m^2/g$ to 170 $m^2/g$, measured using nitrogen and the BET method, and/or the surface-reacted calcium carbonate comprises a ratio of hydroxylapatite to calcite in the range from 1:99 to 99:1 by weight.

It should be understood that for the purpose of the present invention, the following terms have the following meaning:

A "calcium carbonate-comprising material" in the meaning of the present invention can be a mineral material or a synthetic material having a content of calcium carbonate of at least 50 wt.-%, preferably 75 wt.-%, more preferably 90 wt.-%, and most preferably 95 wt.-%, based on the total weight of the calcium carbonate-comprising material.

For the purpose of the present application, "water-insoluble" materials (e.g. water-insoluble salts) are defined as those which, when mixed with 100 ml of deionized water and filtered at 20° C. to recover the liquid filtrate, provide less than or equal to 0.1 g of recovered solid material following evaporation at 95 to 100° C. of 100 g of said liquid filtrate. "Water-soluble" materials (e.g. water-soluble salts) are defined as materials leading to the recovery of greater than 0.1 g of solid material following evaporation at 95 to 100° C. of 100 g of said liquid filtrate. In order to assess whether a material is an insoluble or soluble material in the meaning of the present invention, the sample size is greater than 0.1 g, preferably 0.5 g or more.

"Natural ground calcium carbonate" (GCC) in the meaning of the present invention is a calcium carbonate obtained from natural sources, such as limestone, marble, or chalk, and processed through a wet and/or dry treatment such as grinding, screening and/or fractionating, for example, by a cyclone or classifier.

"Precipitated calcium carbonate" (PCC) in the meaning of the present invention is a synthesized material, obtained by precipitation following reaction of carbon dioxide and lime in an aqueous, semi-dry or humid environment or by precipitation of a calcium and carbonate ion source in water. PCC may be in the vateritic, calcitic or aragonitic crystal form. PCCs are described, for example, in EP 2 447 213 A1, EP 2 524 898 A1, EP 2 371 766 A1, EP 1 712 597 A1, EP 1 712 523 A1, or WO 2013/142473 A1.

In the meaning of the present invention, a "surface-reacted calcium carbonate" is a material comprising calcium carbonate and insoluble, preferably at least partially crystalline, calcium salts of anions of said acids of steps b) and c) above. In a preferred embodiment, the insoluble calcium salt extends from the surface of at least part of the calcium carbonate. The calcium ions forming said at least partially crystalline calcium salt of said anion originate largely from the starting calcium carbonate material. A "salt" is defined as an electrically neutral ionic compound formed of anions and non-hydrogen cations. A "salt" may comprise the anhydrous form as well as forms comprising crystal water (hydrate). A "partially crystalline salt" is defined as a salt that, on XRD analysis, presents an essentially discrete diffraction diagram.

The term "acid" as used herein refers to an acid in the meaning of the definition by Brønsted and Lowry (e.g., $H_2SO_4$, $HSO_4^-$), wherein the term "free acid" refers only to those acids being in the fully protonated form (e.g., $H_2SO_4$).

The "particle size" of particulate materials other than surface-reacted calcium carbonate herein is described by its distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all particles are smaller than this particle size. For the purpose of the present invention, the particle size is specified as weight median particle size $d_{50}$ (wt) unless indicated otherwise. Particle sizes were determined by using a Sedigraph™ 5100 or a Sedigraph™ 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$.

The "particle size" of surface-reacted calcium carbonate herein is described as volume-based particle size distribution. Volume median particle size $d_{50}$ was evaluated using a Malvern Mastersizer 2000 Laser Diffraction System. The $d_{50}$ or $d_{98}$ value, measured using a Malvern Mastersizer 2000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The "specific surface area" (expressed in $m^2/g$) of a material as used throughout the present document can be determined by the Brunauer Emmett Teller (BET) method with nitrogen as adsorbing gas and by use of a ASAP 2460 instrument from Micromeritics. The method is well known to the skilled person and defined in ISO 9277:1995. Samples are conditioned at 100° C. under vacuum for a period of 30 min prior to measurement. The total surface area (in $m^2$) of said material can be obtained by multiplication of the specific surface area (in $m^2/g$) and the mass (in g) of the material.

In the context of the present invention, the term "pore" is to be understood as describing the space that is found between and/or within particles, i.e. that is formed by the particles as they pack together under nearest neighbor contact (interparticle pores), such as in a powder or a compact and/or the void space within porous particles (intraparticle pores), and that allows the passage of liquids under pressure when saturated by the liquid and/or supports absorption of surface wetting liquids.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~nm). The equilibration time used at each pressure step is 20 seconds. The sample material is sealed in a 3 cm³ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bimodal, and by taking the specific pore volume intruded by mercury into pores finer than the modal turning point, i.e. finer than the bimodal point of inflection, we thus define the specific intraparticle pore volume. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

For the purpose of the present invention, the "solids content" of a liquid composition is a measure of the amount of material remaining after all the solvent or water has been evaporated. If necessary, the "solids content" of a suspension given in wt.-% in the meaning of the present invention can be determined using a Moisture Analyzer HR73 from Mettler-Toledo (T=120° C., automatic switch off 3, standard drying) with a sample size of 5 to 20 g.

Unless specified otherwise, the term "drying" refers to a process according to which at least a portion of water is removed from a material to be dried such that a constant weight of the obtained "dried" material at 120° C. is reached. Moreover, a "dried" or "dry" material may be defined by its total moisture content which, unless specified otherwise, is less than or equal to 1.0 wt.-%, preferably less than or equal to 0.5 wt.-%, more preferably less than or equal to 0.2 wt.-%, and most preferably between 0.03 and 0.07 wt.-%, based on the total weight of the dried material.

A "suspension" or "slurry" in the meaning of the present invention comprises undissolved solids and water, and optionally further additives, and usually contains large amounts of solids and, thus, is more viscous and can be of higher density than the liquid from which it is formed.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

The inventive process for producing a surface-reacted calcium carbonate comprises the steps of a) providing an aqueous suspension of calcium carbonate-comprising material, b) providing phosphoric acid, c) providing at least one dicarboxylic acid of structural formula (I) or a corresponding salt thereof, and d) adding the phosphoric acid of step b) to the calcium carbonate-comprising material of step a) over a phosphoric acid addition time period $\Delta t_P$ in the presence of carbon dioxide to form an aqueous suspension of surface-reacted calcium carbonate. The carbon dioxide is formed in-situ by the addition of phosphoric acid and/or is supplied from an external source, and the at least one dicarboxylic acid of step c) is added in step d) during the phosphoric acid addition time period $\Delta t_P$.

In the following preferred embodiments of the inventive composition will be set out in more detail. It is to be understood that these embodiments and details also apply to the inventive products and uses.

Process Step a)

According to step a) of the process of the present invention, a calcium-carbonate comprising material is provided.

According to one embodiment the at least one calcium carbonate-comprising material has a content of calcium carbonate of at least 50 wt.-%, preferably 75 wt.-%, more preferably 90 wt.-%, and most preferably 95 wt.-%, based on the total weight of the calcium carbonate-comprising material. According to another embodiment the at least one calcium carbonate comprising material consists of calcium carbonate.

The calcium carbonate-comprising material may be selected from natural ground calcium carbonate, precipitated calcium carbonate, dolomite, or mixtures thereof. The natural ground calcium carbonate may be preferably selected from marble, limestone and/or chalk, and/or the precipitated calcium carbonate may be preferably selected from vaterite, calcite and/or aragonite.

According to one embodiment of the present invention, the calcium carbonate-comprising material is a natural ground calcium carbonate and/or a precipitated calcium carbonate, preferably the natural ground calcium carbonate is selected from the group consisting of marble, chalk, dolomite, limestone, and mixtures thereof, and/or the precipitated calcium carbonate is selected from the group consisting of precipitated calcium carbonates having an aragonitic, vateritic or calcitic crystal form, and mixtures thereof.

"Natural ground calcium carbonate" (GCC) is understood to be manufactured from a naturally occurring form of calcium carbonate, mined from sedimentary rocks such as limestone or chalk, or from metamorphic marble rocks, eggshells or seashells.

Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable form of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

According to one embodiment of the present invention the source of natural ground calcium carbonate (GCC) is selected from marble, chalk, limestone, or mixtures thereof. Preferably, the source of ground calcium carbonate is marble, and more preferably dolomitic marble and/or magnesitic marble. According to one embodiment of the present invention the GCC is obtained by dry grinding. According to another embodiment of the present invention the GCC is obtained by wet grinding and subsequent drying.

According to one embodiment of the present invention, the calcium carbonate comprises one type of natural ground calcium carbonate. According to another embodiment of the present invention, the calcium carbonate comprises a mixture of two or more types of natural ground calcium carbonates selected from different sources.

"Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

Precipitated calcium carbonate may be ground prior to the treatment with carbon dioxide and at least one $H_3O^+$ ion donor by the same means as used for grinding natural ground calcium carbonate as described above.

"Dolomite" in the meaning of the present invention is a calcium carbonate containing mineral, namely a carbonic calcium-magnesium-mineral, having the chemical composition of $CaMg(CO_3)_2$ ("$CaCO_3 \cdot MgCO_3$"). A dolomite mineral may contain at least 30.0 wt.-% $MgCO_3$, based on the total weight of dolomite, preferably more than 35.0 wt.-%, and more preferably more than 40.0 wt.-% $MgCO_3$.

According to one embodiment of the present invention, the calcium carbonate-comprising material is in form of particles having a weight median particle size $d_{50}$ of 0.05 to 10.0 µm, preferably 0.2 to 5.0 µm, more preferably 0.4 to 3.0 µm, and most preferably 0.6 to 1.2 µm.

According to a further embodiment of the present invention, the calcium carbonate-comprising material is in form of particles having a top cut particle size $d_{98}$ of 0.15 to 55 µm, preferably 1 to 30 µm, more preferably 2 to 18 µm, and most preferably 3 to 7 µm.

The calcium carbonate-comprising material may be used dry or in form of an aqueous suspension. According to a preferred embodiment, the calcium carbonate-comprising material is in form of an aqueous suspension having a solids content within the range of 1 wt.-% to 90 wt.-%, preferably 3 wt.-% to 60 wt.-%, more preferably 5 wt.-% to 40 wt.-%, and most preferably 10 wt.-% to 25 wt.-%, based on the weight of the aqueous suspension.

The term "aqueous" suspension refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous suspension comprises at least one water-miscible organic solvent, the liquid phase of the aqueous suspension comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous suspension. For example, the liquid phase of the aqueous suspension consists of water.

According to a preferred embodiment of the present invention, the aqueous suspension consists of water and the calcium carbonate-comprising material.

Alternatively, the aqueous suspension of the calcium carbonate-comprising material may comprise further additives, for example, a dispersant. A suitable dispersant may be selected from polyphosphates, and is in particular a tripolyphosphate. Another suitable dispersant may be selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid are especially preferred. The weight average molecular weight $M_w$ of such products is preferably in the range from 2 000 to 15 000 g/mol, with a weight average molecular weight $M_w$ from 3 000 to 7 000 g/mol or 3 500 to 6 000 g/mol being especially preferred. According to an exemplary embodiment, the dispersant is sodium polyacrylate having a weight average molecular weight $M_w$ from 2 000 to 15 000 g/mol, preferably from 3 000 to 7 000 g/mol, and most preferably from 3 500 to 6 000 g/mol.

According to one embodiment of the present invention, the calcium carbonate-comprising material provided in process step a) is an aqueous suspension of natural ground calcium carbonate and/or precipitated calcium carbonate having a solids content within the range of 1 wt.-% to 90 wt.-%, preferably 3 wt.-% to 60 wt.-%, more preferably 5 wt.-% to 40 wt.-%, and most preferably 10 wt.-% to 25 wt.-%, based on the weight of the aqueous suspension.

Process Step b)

According to step b) of the process of the present invention, phosphoric acid is provided.

According to one embodiment the phosphoric acid is provided in form of an aqueous solution comprising the phosphoric acid in an amount from 0.1 to 95 wt.-%, based on the total weight of the aqueous solution, preferably in an amount from 1 to 85 wt.-%, more preferably in an amount from 10 to 50 wt.-%, and most preferably in an amount from 20 to 40 wt.-%.

According to another embodiment, the phosphoric acid is provided in an amount from 1 to 60 wt.-%, based on the total weight of the calcium carbonate-comprising material, preferably from 5 to 55 wt.-%, more preferably from 10 to 50 wt.-%, and most preferably from 20 to 50 wt.-%.

Process Step c)

According to step c) of the process of the present invention at least one dicarboxylic acid of structural formula (I) or a corresponding salt thereof is provided (I)

wherein
n is 1, 2 or 3, and
X is —$CH_2$—, —$CHR^a$—, —$CR^aR^b$, or —$CR^a$=$CR^b$ (cis)-,
wherein $R^a$ and $R^b$ are independently selected from the group consisting of H, OH, $OR^c$, —$CH_3$, —$CH_2CH_3$, —$CH_2CH_2CH_3$, —$CH(CH_3)_2$, tBu, secBu, and nBu, and wherein $R^c$ is Li, Na, or K.

The at least one dicarboxylic acid may be provided in anhydrous form or as a corresponding salt thereof. Examples of suitable corresponding salts are hydrates such as monosodium hydrate, disodium hydrate, monopotassium hydrate or dipotassium hydrate and/or hydrochlorate.

According to one embodiment the at least one dicarboxylic acid or corresponding salt thereof consists of only one dicarboxylic acid of structural formula (I) or a corresponding salt thereof. Alternatively, the at least one dicarboxylic acid or corresponding salt thereof may be a mixture two or more dicarboxylic acids of structural formula (I), a mixture two or more corresponding salts of the dicarboxylic acids of structural formula (I), or a mixture two or more dicarboxylic acids of structural formula (I) or corresponding salts of the dicarboxylic acids of structural formula (I).

The following paragraphs are intended to refer to the at least one dicarboxylic acid of structural formula (I) as well as to corresponding salts thereof.

According to one embodiment of the present invention n is 1 or 2, and preferably n is 1.

According to one embodiment X is —$CH_2$—, —$CHR^a$—, —$CR^aR^b$, or —$CR^a$=$CR^b$ (cis)-, wherein $R^a$ and $R^b$ are independently selected from the group consisting of H, OH, —$CH_3$, and —$CH_2CH_3$. According to another embodiment X is —$CH_2$—, —$CHR^a$—, —$CR^aR^b$, or —$CR^a$=$CR^b$ (cis)-, wherein $R^a$ and $R^b$ are independently selected from the group consisting of H and OH.

According to one embodiment X is —$CH_2$—, —$CHR^a$—, or —$CR^a$=$CR^b$ (cis)-, wherein $R^a$ and $R^b$ are independently selected from the group consisting of H, OH, $OR^c$, —$CH_3$, —$CH_2CH_3$, —$CH_2CH_2CH_3$, —$CH(CH_3)_2$, tBu, secBu, and nBu, and wherein $R^c$ is Li, Na, or K. According to still another embodiment X is —$CH_2$—, —$CHR^a$—, or —$CR^a$=$CR^b$ (cis)-, wherein $R^a$ and $R^b$ are independently selected from the group consisting of H and OH.

According to a preferred embodiment n is 1 or 2, and X is —$CH_2$—, —$CHR^a$—, or —$CR^a$=$CR^b$ (cis)-, wherein $R^a$ and $R^b$ are independently selected from the group consisting of H, OH, $OR^c$, —$CH_3$, —$CH_2CH_3$, —$CH_2CH_2CH_3$, —$CH(CH_3)_2$, tBu, secBu, and nBu, and wherein $R^c$ is Li, Na, or K. According to another preferred embodiment n is 1 or 2, and X is —$CH_2$—, —$CHR^a$—, or —$CR^a$=$CR^b$ (cis)-, wherein $R^a$ and $R^b$ are independently selected from the group consisting of H, OH, —$CH_3$, and —$CH_2CH_3$. According to still another preferred embodiment n is 1 or 2, and X is —$CH_2$—, —$CHR^a$—, or —$CR^a$=$CR^b$ (cis)-, wherein $R^a$ and $R^b$ are independently selected from the group consisting of H and OH.

According to a preferred embodiment, the at least one dicarboxylic acid is selected from one of the following structural formulae:

(II)

(III)

(IV)

wherein $R^1$ and $R^2$ are independently selected from the group consisting of H, OH, $OR^c$, —$CH_3$, —$CH_2CH_3$, —$CH_2CH_2CH_3$, —$CH(CH_3)_2$, tBu, secBu, and nBu, and wherein $R^c$ is Li, Na, or K. According to one embodiment, $R^1$ and $R^2$ are independently selected from the group consisting of H, OH, —$CH_3$, and —$CH_2CH_3$, and preferably $R^1$ and $R^2$ are independently selected from the group consisting of H and OH.

According to a preferred embodiment of the present invention, in step c) the at least one dicarboxylic acid of structural formula (I) is provided. According to one embodiment the at least one dicarboxylic acid consists of only one dicarboxylic acid of structural formula (I) or a mixture two or more dicarboxylic acids of structural formula (I).

According to one embodiment the at least one dicarboxylic acid is selected from the group consisting of maleic acid, malonic acid, malic acid, tartaric acid, optionally substituted with one or more methyl and/or ethyl groups, and mixtures thereof. Preferably the at least one carboxylic acid is selected from malic acid and/or tartaric acid.

The at least one dicarboxylic acid of structural formula (I) or the corresponding salt thereof may have a p$K_a$ value at 25° C. for the first hydrogen of 1.8 or more. According to one embodiment the at least one dicarboxylic acid of structural formula (I) or the corresponding salt thereof is a weak acid having a p$K_a$ at 25° C. for the first hydrogen of 2.5 or more. Preferably, the at least one dicarboxylic acid of structural formula (I) or the corresponding salt thereof may have a p$K_a$ at 25° C. for the first hydrogen of 3.0 or more.

The at least one dicarboxylic acid of structural formula (I) or the corresponding salt thereof can be provided as a concentrated solution or a diluted solution. As will be understood by the skilled person, the content of the at least one dicarboxylic acid of structural formula (I) or the corresponding salt thereof expressed in "wt.-%" always refers to the anhydrous, pure form of the acid or corresponding salt thereof.

According to one embodiment, the at least one dicarboxylic acid of structural formula (I) or the corresponding salt thereof has a molecular weight of less than 1 000 g/mol, preferably less than 750 g/mol, and more preferably less than 500 g/mol.

According to one embodiment the at least one dicarboxylic acid of structural formula (I) or the corresponding salt thereof is provided in an amount from 0.1 to 50 wt.-%, based on the total weight of the calcium carbonate-comprising material, preferably from 0.2 to 25 wt.-%, more preferably from 0.5 to 10 wt.-%, and most preferably from 1 to 5 wt.-%.

According to one embodiment the at least one dicarboxylic acid of structural formula (I) or the corresponding salt thereof is provided in an amount from 1 to 25 wt.-% based on the total weight of the phosphoric acid, preferably from 3 to 17 wt.-%, more preferably from 6 to 14 wt.-%, and most preferably from 9 to 11 wt.-%.

Preferably, the weight ratio of the at least one dicarboxylic acid of structural formula (I) or the corresponding salt thereof of process step c) to the phosphoric acid of process step b) may be from 1:50 to 50:1, preferably from 1:20 to 1:1, more preferably from 1:15 to 1:5, and most preferably from 1:12 to 1:8 by weight.

Process Step d)

According to step d) of the process of the present invention, the phosphoric acid of step b) is added to the calcium carbonate-comprising material over a phosphoric acid addition time period $\Delta t_P$ in the presence of carbon dioxide to form an aqueous suspension of surface-reacted calcium carbonate, wherein the carbon dioxide is formed in-situ by the addition of phosphoric acid and/or is supplied from an external source, and wherein the at least one dicarboxylic acid of step c) or the corresponding salt thereof is added in step d) during the phosphoric acid addition time period $\Delta t_P$.

The phosphoric addition time period $\Delta t_P$ starts at a time $t_0$ with the beginning of the addition of the phosphoric acid and ends at the time $t_P$, wherein the total amount of phosphoric acid has been added.

According to one embodiment, the phosphoric addition time period $\Delta t_P$ is at least 1 min, preferably at least 5 min, more preferably at least 10 min, and most preferably at least 15 min. According to another embodiment, the phosphoric addition time period $\Delta t_P$ is from 1 to 30 min, preferably from 2 to 20 min, more preferably from 5 to 15 min, and most preferably from 7 to 12 min.

The phosphoric acid and the at least one dicarboxylic acid of step c) or the corresponding salt thereof may be added together in step d) in form of mixture, or the phosphoric acid and the at least one dicarboxylic acid of step c) or the corresponding salt thereof may be added in step d) simultaneously in form of separate streams.

In case the at least one dicarboxylic acid of step c) or the corresponding salt thereof is added as a separate stream, it may be added at the beginning of the phosphoric acid addition time period $\Delta t_P$, i.e. at $t_0$, or at a later point in time.

According to one embodiment the at least one dicarboxylic acid of step c) or the corresponding salt thereof is added between the beginning of the phosphoric acid addition time period $\Delta t_P$ at $t_0$ and before 60% of the phosphoric acid addition time period $\Delta t_P$ has elapsed, preferably between the beginning of the phosphoric acid addition time period $\Delta t_P$ at $t_0$ and before 50% of the phosphoric acid addition time period $\Delta t_P$ has elapsed, more preferably between the beginning of the phosphoric acid addition time period $\Delta t_P$ at $t_0$ and before 30% of the phosphoric acid addition time period $\Delta t_P$ has elapsed, even more preferably between the beginning of the phosphoric acid addition time period $\Delta t_P$ at $t_0$ and before 20% of the phosphoric acid addition time period $\Delta t_P$ has elapsed, and most preferably between the beginning of the phosphoric acid addition time period $\Delta t_P$ at $t_0$ and before 10% of the phosphoric acid addition time period $\Delta t_P$ has elapsed.

The at least one dicarboxylic acid of step c) or the corresponding salt thereof may be added over a certain dicarboxylic acid addition time period $\Delta t_{DA}$. The dicarboxylic addition time period $\Delta t_{DA}$ starts at a time $t_0$ with the beginning of the addition of the dicarboxylic acid and ends at the time $t_{DA}$, wherein the total amount of dicarboxylic acid has been added. In case the at least one dicarboxylic acid of step c) or the corresponding salt thereof is added together in form of a mixture, it is clear $\Delta t_P$ equals $\Delta t_{DA}$. In case the at least one dicarboxylic acid of step c) or the corresponding salt thereof is added separately, $\Delta t_P$ may differ from $\Delta t_{DA}$.

According to one embodiment the at least one dicarboxylic acid of step c) is added over a dicarboxylic acid addition time period $\Delta t_{DA}$ and $\Delta t_{DA}$ is from 1 to 20% of the total phosphoric acid addition time period $\Delta t_P$, preferably from 2 to 15%, and more preferably from 3 to 10%.

According to step d) of the process of the present invention, the calcium carbonate-comprising material is treated with carbon dioxide. If a strong acid such as phosphoric acid is used in the treatment of the calcium carbonate-comprising material, the carbon dioxide can be automatically formed. Alternatively or additionally, the carbon dioxide can be supplied from an external source.

Preferably, the concentration of gaseous carbon dioxide in the suspension formed in step d) is, in terms of volume, such that the ratio (volume of suspension):(volume of gaseous $CO_2$) is from 1:0.05 to 1:20, even more preferably 1:0.05 to 1:5.

In a preferred embodiment, the phosphoric acid treatment step and/or the carbon dioxide treatment of step d) are repeated at least once, more preferably several times.

Subsequent to the treatment with the phosphoric acid of step b), the at least one dicarboxylic acid of step c) or corresponding salt thereof, and carbon dioxide, the pH of the aqueous suspension, measured at 20° C., naturally reaches a value of greater than 6.0, preferably greater than 6.5, more preferably greater than 7.0, even more preferably greater than 7.5, thereby preparing the surface-reacted calcium carbonate as an aqueous suspension having a pH of greater than 6.0, preferably greater than 6.5, more preferably greater than 7.0, even more preferably greater than 7.5.

According to one embodiment of the present invention, step d) is carried out at a temperature from 20 to 90° C., preferably from 30 to 85° C., more preferably from 40 to 80° C., even more preferably from 50 to 75° C., and most preferably from 60 to 70° C.

Process step d) may be carried out by simply adding, for example, by pouring, discharging, or injecting, the phosphoric acid of step b) and/or the at least one dicarboxylic acid of step c) or corresponding salt thereof into the calcium carbonate-comprising material. According to one embodiment, process step d) is carried out under mixing conditions. Suitable mixing methods are known to the skilled person. Examples of suitable mixing methods are shaking, mixing, stirring, agitating, ultrasonication, or inducing a turbulent or laminar flow by means such as baffles or lamellae. Suitable mixing equipment is known to the skilled person, and may be selected, for example, from stirrers, such as rotor stator systems, blade stirrers, propeller stirrers, turbine stirrers, or anchor stirrers, static mixers such as pipes including baffles or lamellae. According to an exemplary embodiment of the present invention, a rotor stator stirrer system is used.

According to another exemplary embodiment, in step d) the formed suspension is mixed so as to develop an essentially laminar flow. The skilled person will adapt the mixing conditions such as the mixing speed and temperature according to his process equipment.

Depending on the amount of water that is introduced during step d) by contacting the aforementioned compounds, additional water may be introduced during process step d), for example, in order to control and/or maintain and/or achieve the desired solids content or Brookfield viscosity of the obtained aqueous suspension. According to one embodiment the solids content of the mixture obtained in step d) is from 5 to 80 wt.-%, preferably from 20 to 78 wt.-%, based on the total weight of the mixture. The Brookfield viscosity of the obtained aqueous suspension may be from 10 to 10 000 mPa·s, preferably from 50 to 1 000 mPa·s.

The process of the present invention may be carried out in form of a continuous process or a batch process, preferably in from of a continuous process. Process step d) may repeated once or several times, if appropriate.

According to one embodiment of the present invention, the obtained suspension comprising the surface-reacted calcium carbonate has a solid content of up to 25% by weight, preferably between 5% and 20% by weight.

According to one embodiment, the aqueous phase of the obtained surface-reacted calcium carbonate slurry may be replaced with deionized water. In a more preferred embodiment, the aqueous phase of said surface-reacted calcium carbonate suspension is collected and recirculated into the process according to the present invention as a means to provide all or part of the solubilized calcium ions. This is particularly of interest when the process according to the invention is a continuous process.

The inventors of the present invention have surprisingly found that by the inventive process it is possible to increase the specific BET surface area of surface-reacted calcium carbonate in a predetermined way, for example, by a particular percentage compared to the calcium carbonate comprising source material. The addition of the at least one dicarboxylic acid of structural formula (I) or a corresponding salt thereof during step d) of the inventive process may lead to surface-reacted calcium carbonate particles having an increased specific BET surface area. Furthermore, it was found that the particle size of the obtained surface-reacted calcium carbonate is not affected significantly by the addition of the at least one dicarboxylic acid of structural formula (I) or a corresponding salt thereof. Thus, the process of the present invention may provide the possibility of selectively increasing the specific BET surface area of surface-reacted calcium carbonate independently of the particle size distribution.

According to one embodiment, the inventive process leads to a surface-reacted reacted calcium carbonate having a specific surface area (BET) that is at least 15%, preferably at least 25% greater, more preferably at least 50% greater, even more preferably at least 100% greater, and most preferably at least 150% greater than the specific surface area (BET) of surface-reacted calcium carbonate obtained by treating the calcium carbonate-comprising material provided in step a) with phosphoric acid only, measured using nitrogen and the BET method. For example, the inventive process may lead to a surface-reacted reacted calcium carbonate having a specific surface area (BET) that is between 25 and 49% greater, preferably between 50 and 99% greater, more preferably between 100 and 149% greater, and most preferably between 150 and 200% greater than the specific surface area (BET) of surface-reacted calcium carbonate obtained by treating the calcium carbonate-comprising material provided in step a) with phosphoric acid only, measured using nitrogen and the BET method.

According to an exemplary embodiment, the at least one dicarboxylic acid of step c) is maleic acid, and the obtained surface-reacted calcium carbonate has a specific surface area (BET) that is at least 25% greater than the specific surface area (BET) of surface-reacted calcium carbonate obtained by treating the calcium carbonate-comprising material provided in step a) with phosphoric acid only. According to another exemplary embodiment, the at least one dicarboxylic acid of step c) is malonic acid, and the obtained surface-reacted calcium carbonate has a specific surface area (BET) that is at least 50% greater than the specific surface area (BET) of surface-reacted calcium carbonate obtained by treating the calcium carbonate-comprising material provided in step a) with phosphoric acid only. According to still another exemplary embodiment, the at least one dicarboxylic acid of step c) is malic acid, and the obtained surface-reacted calcium carbonate has a specific surface area (BET) that is at least 100% greater than the specific surface area (BET) surface-reacted calcium carbonate obtained by treating the calcium carbonate-comprising material provided in step a) with phosphoric acid only. According to still another exemplary embodiment, the at least one dicarboxylic acid of step c) is tartaric acid, and the obtained surface-reacted calcium carbonate has a specific surface area (BET) that is at least 100% greater than the specific surface area (BET) of surface-reacted calcium carbonate obtained by treating the calcium carbonate-comprising material provided in step a) with phosphoric acid only.

According to one embodiment, a process for producing a surface-reacted calcium carbonate is provided, comprising the steps of:
a) providing an aqueous suspension of natural ground calcium carbonate and/or precipitated calcium carbonate,
b) providing phosphoric acid,
c) providing at least one dicarboxylic acid selected from the group consisting of maleic acid, malonic acid, malic acid, tartaric acid, optionally substituted with one or more methyl and/or ethyl groups, and mixtures thereof, and preferably selected from malic acid and/or tartaric acid, and
d) adding the phosphoric acid of step b) to the calcium carbonate-comprising material of step a) over a phosphoric acid addition time period $\Delta t_P$ in the presence of carbon dioxide to form an aqueous suspension of surface-reacted calcium carbonate,
wherein the carbon dioxide is formed in-situ by the addition of phosphoric acid and/or is supplied from an external source, and wherein the at least one dicarboxylic acid or a corresponding salt thereof is added between the beginning of the phosphoric acid addition time period $\Delta t_P$ at $t_0$ and before 60% of the phosphoric acid addition time period $\Delta t_P$ has elapsed.

Additional Process Steps

According to one embodiment, the process of the present invention further comprises a step of agitating the aqueous suspension after step d). Preferably, the suspension is agitated for at least 1 min, preferably for at least 5 min, more preferably for at least 10 min, and most preferably for at least 15 min.

According to one embodiment, an additional dicarboxylic acid or dicarboxylic acid salt is added during step d). Said additional dicarboxylic acid or acid salt can be added separately or together with the at least one dicarboxylic acid of step c) or corresponding salt thereof. According to one embodiment, the additional dicarboxylic acid or acid salt is added during step d) together with the at least one dicarboxylic acid of step c) or corresponding salt thereof in form of a mixture. The additional dicarboxylic acid or acid salt may have a $pK_a$ at 25° C. of 2.5 or more, preferably a $pK_a$ at 25° C. of 3.0 or more.

The aqueous suspension of surface-reacted calcium carbonate may be further processed, e.g., the surface-reacted calcium carbonate may be separated from the aqueous suspension and/or subjected to a drying step.

The obtained surface-reacted calcium carbonate slurry may be concentrated, optionally up to the point of obtaining a dry surface-reacted calcium carbonate product. If the aqueous suspension described above is dried, the obtained solid (i.e. dry or containing as little water that it is not in a fluid form) surface-reacted calcium carbonate may be in the form of granules or a powder. In the case of a dry product, this product may additionally be treated with fatty acids. In the case of a dry product, this product may be additionally washed with water.

According to one embodiment, the process of the present invention further comprises a step e) of separating the surface-reacted calcium carbonate from the aqueous suspension obtained in step d). Thus, a process for manufacturing a surface-reacted calcium carbonate may comprise the following steps:
a) providing an aqueous suspension of calcium carbonate-comprising material,
b) providing phosphoric acid,
c) providing at least one dicarboxylic acid of structural formula (I) or a corresponding salt thereof, (I)

wherein
n is 1, 2 or 3, and
X is —CH$_2$—, —CHR$^a$—, —CR$^a$R$^b$, or —CR$^a$=CR$^b$ (cis)-,
wherein R$^a$ and R$^b$ are independently selected from the group consisting of H, OH, OR$^c$, —CH$_3$, —CH$_2$CH$_3$, —CH$_2$CH$_2$CH$_3$, —CH(CH$_3$)$_2$, tBu, secBu, and nBu, and wherein R$^c$ is Li, Na, or K,
d) adding the phosphoric acid of step b) to the calcium carbonate-comprising material of step a) over a phosphoric acid addition time period $\Delta t_P$ in the presence of carbon dioxide to form an aqueous suspension of surface-reacted calcium carbonate,
wherein the carbon dioxide is formed in-situ by the addition of phosphoric acid and/or is supplied from an external source, and
wherein the at least one dicarboxylic acid of step c) is added in step d) during the phosphoric acid addition time period $\Delta t_P$, and
e) separating the surface-reacted calcium carbonate from the aqueous suspension obtained from step d).

The surface-reacted calcium carbonate obtained from step d) may be separated from the aqueous suspension by any conventional means of separation known to the skilled person. According to one embodiment of the present invention, in process step e) the surface-reacted calcium carbonate is separated mechanically and/or thermally. Examples of mechanical separation processes are filtration, e.g. by means of a drum filter or filter press, nanofiltration, or centrifugation. An example for a thermal separation process is a concentrating process by the application of heat, for example, in an evaporator. According to a preferred embodiment, in process step e) the surface-reacted calcium carbonate is separated mechanically, preferably by filtration and/or centrifugation.

After separation, the surface-reacted calcium carbonate can be dried in order to obtain a dried surface-reacted calcium carbonate. According to one embodiment, the process of the present invention further comprises a step f) of drying the surface-reacted calcium carbonate after step d) or after step e), if present, at a temperature in the range from 60 to 600° C., preferably until the moisture content of the surface-reacted calcium carbonate is between 0.01 and 5 wt-%, based on the total weight of the dried surface-reacted calcium carbonate.

According to one embodiment of the present invention, a process for manufacturing a dried surface-reacted calcium carbonate is provided comprising the following steps:
a) providing an aqueous suspension of calcium carbonate-comprising material,
b) providing phosphoric acid,
c) providing at least one dicarboxylic acid of structural formula (I) or a corresponding salt thereof, (I)

wherein
n is 1, 2 or 3, and
X is —CH$_2$—, —CHR$^a$—, —CR$^a$R$^b$, or —CR$^a$=CR$^b$ (cis)-,
wherein R$^a$ and R$^b$ are independently selected from the group consisting of H, OH, OR', —CH$_3$, —CH$_2$CH$_3$, —CH$_2$CH$_2$CH$_3$, —CH(CH$_3$)$_2$, tBu, secBu, and nBu, and wherein R$^c$ is Li, Na, or K,
d) adding the phosphoric acid of step b) to the calcium carbonate-comprising material of step a) over a phosphoric acid addition time period $\Delta t_P$ in the presence of carbon dioxide to form an aqueous suspension of surface-reacted calcium carbonate,
wherein the carbon dioxide is formed in-situ by the addition of phosphoric acid and/or is supplied from an external source, and wherein the at least one dicarboxylic acid of step c) is added in step d) during the phosphoric acid addition time period $\Delta t_P$, e) separating the surface-reacted calcium carbonate from the aqueous suspension obtained from step d), and f) drying the surface-reacted calcium carbonate.

In general, the drying step f) may take place using any suitable drying equipment and can, for example, include thermal drying and/or drying at reduced pressure using equipment such as an evaporator, a flash drier, an oven, a spray drier, jet drier and/or drying in a vacuum chamber. The drying step f) can be carried out at reduced pressure, ambient pressure or under increased pressure. For temperatures below 100° C. it may be preferred to carry out the drying step under reduced pressure.

According to one preferred embodiment, the separation is carried out by a thermal method. This may allow to dry the surface-reacted calcium carbonate subsequently without changing the equipment.

According to one embodiment, in process step f) the surface-reacted calcium carbonate is dried until the moisture content of the formed surface-reacted calcium carbonate is less than or equal to 1.0 wt.-%, based on the total weight of the dried surface-reacted calcium carbonate, preferably less than or equal to 0.5 wt.-%, and more preferably less than or equal to 0.2 wt.-%. According to another embodiment, in process step d) the surface-reacted calcium carbonate is dried until the moisture content of the formed surface-reacted calcium carbonate is between 0.01 and 0.15 wt.-%, preferably between 0.02 and 0.10 wt.-%, and more preferably between 0.03 and 0.07 wt.-%, based on the total weight of the dried surface-reacted calcium carbonate.

The Surface-Reacted Calcium Carbonate

According to a further aspect of the present invention, a surface-reacted calcium carbonate is provided, wherein the surface-reacted calcium carbonate is obtainable by a process of the present invention.

Thus, the surface-reacted calcium carbonate may be obtained by a process comprising the steps of:

a) providing an aqueous suspension of calcium carbonate-comprising material, b) providing phosphoric acid, c) providing at least one dicarboxylic acid of structural formula (I) or a corresponding salt thereof wherein n is 1, 2 or 3, and X is —CH$_2$—, —CHR$^a$—, —CR$^a$R$^b$, or —CR$^a$═CR$^b$ (cis)-, wherein R$^a$ and R$^b$ are independently selected from the group consisting of H, OH, OR$^c$, —CH$_3$, —CH$_2$CH$_3$, —CH$_2$CH$_2$CH$_3$, —CH(CH$_3$)$_2$, tBu, secBu, and nBu, and wherein R$^c$ is Li, Na, or K, and d) adding the phosphoric acid of step b) to the calcium carbonate-comprising material of step a) over a phosphoric acid addition time period $\Delta t_P$ in the presence of carbon dioxide to form an aqueous suspension of surface-reacted calcium carbonate, wherein the carbon dioxide is formed in-situ by the addition of phosphoric acid and/or is supplied from an external source, and wherein the at least one dicarboxylic acid of step c) is added in step d) during the phosphoric acid addition time period $\Delta t_P$.

The surface-reacted calcium carbonate may have different particle shapes, such as e.g. the shape of roses, golf balls and/or brains.

According to one embodiment the surface-reacted calcium carbonate has a specific surface area (BET) of from 55 m$^2$/g to 200 m$^2$/g, preferably from 60 m$^2$/g to 190 m$^2$/g, more preferably from 70 m$^2$/g to 180 m$^2$/g, even more preferably from 80 m$^2$/g to 170 m$^2$/g, and most preferably from 100 m$^2$/g to 170 m$^2$/g, measured using nitrogen and the BET method.

According to one embodiment, the surface-reacted calcium carbonate has a volume determined median particle size $d_{50}$ (vol) from 1 to 75 µm, preferably from 2 to 50 µm, more preferably from 3 to 40 µm, even more preferably from 4 to 30 µm, and most preferably from 5 to 15 µm, and/or a volume determined top cut particle size $d_{98}$ (vol) from 2 to 150 µm, preferably from 4 to 100 µm, more preferably from 6 to 80 µm, even more preferably from 8 to 60 µm, and most preferably from 10 to 30 µm.

The surface-reacted calcium carbonate may have an intra-particle intruded specific pore volume in the range from 0.1 to 2.3 cm$^3$/g, preferably from 0.2 to 2.0 cm$^3$/g, more preferably from 0.4 to 1.8 cm$^3$/g and most preferably from 0.6 to 1.6 cm$^3$/g, calculated from mercury porosimetry measurement.

The intra-particle pore size of the surface-reacted calcium carbonate preferably is in a range of from 0.004 to 1.6 µm, more preferably in a range of between 0.005 to 1.3 µm, especially preferably from 0.006 to 1.15 µm and most preferably of 0.007 to 1.0 µm.

The surface-reacted calcium carbonate obtainable by a process of the present invention can be provided in form of a suspension of surface-reacted calcium carbonate, as a separated surface-reacted calcium carbonate or as a dried surface-reacted calcium carbonate. According to a preferred embodiment surface-reacted calcium carbonate is a dried surface-reacted calcium carbonate.

In case the surface-reacted calcium carbonate has been dried, the moisture content of the dried surface-reacted calcium carbonate can be between 0.01 and 5 wt.-%, based on the total weight of the dried surface-reacted calcium carbonate. According to one embodiment, the moisture content of the dried surface-reacted calcium carbonate is less than or equal to 1.0 wt.-%, based on the total weight of the dried surface-reacted calcium carbonate, preferably less than or equal to 0.5 wt.-%, and more preferably less than or equal to 0.2 wt.-%. According to another embodiment, the moisture content of the dried surface-reacted calcium carbonate is between 0.01 and 0.15 wt.-%, preferably between 0.02 and 0.10 wt.-%, and more preferably between 0.03 and 0.07 wt.-%, based on the total weight of the dried surface-reacted calcium carbonate.

The use of phosphoric acid in the inventive process may lead to the formation of hydroxylapatite. The surface-reacted calcium carbonate may therefore provide a ratio of hydroxylapatite to calcite, aragonite and/or vaterite in the range of from 1:99 to 99:1 by weight. According to one embodiment, the surface-reacted calcium carbonate comprises a ratio of hydroxylapatite to calcite in the range from 1:99 to 99:1 by weight. According to a preferred embodiment, the surface-reacted calcium carbonate comprises a ratio of hydroxylapatite to calcite in the range from 1:9 to 9:1 by weight, preferably from 1:7 to 8:1, more preferably from 1:5 to 7:1, and most preferably from 1:4 to 7:1.

The surface-reacted calcium carbonate may be used for various applications.

The inventive surface-reacted calcium carbonate or a slurry of said surface-reacted calcium carbonate may be used (in the form of slurries or in the form of dry products) in paper, tissue paper, plastics, paints, or as a controlled release or water treatment agent.

The surface-reacted calcium carbonate obtained by the process of the present invention is preferably brought into contact with water to be purified, e.g. industrial waste water, drinking water, urban waste water, waste water from breweries, or water in the paper industry, by any conventional means known to the skilled person.

The surface-reacted calcium carbonate can be added as an aqueous suspension, e.g. the suspension described above. Alternatively, it can be added to the water to be purified in any appropriate solid form, e.g. in the form of granules or a powder or in the form of a cake.

The water may contain organic impurities, e.g. resulting from human waste, organic materials, soil, surfactants as well as inorganic impurities, in particular heavy metal impurities such as iron- or manganese-containing compounds. Harmful components that can be removed from the water with the purification process of the present invention also include microorganisms such as bacteria, fungi, archaea, or protists.

According to one embodiment, the surface-reacted calcium carbonate obtainable by a process according to the present invention is used in polymer applications, paper coating applications, paper making, paints, coatings, sealants, printing inks, adhesives, food, feed, pharmaceuticals, concrete, cement, cosmetics, water treatment, engineered wood applications, plasterboard applications, packaging applications and/or agricultural applications.

According to a further aspect an article comprising a surface-reacted calcium carbonate according to the present invention is provided, wherein the article is selected from paper products, engineered wood products, plasterboard products, polymer products, hygiene products, medical products, healthcare products, filter products, woven materials, nonwoven materials, geotextile products, agriculture products, horticulture products, clothing, footwear products, baggage products, household products, industrial products, packaging products, building products, and construction products.

The scope and interest of the invention will be better understood based on the following examples which are intended to illustrate certain embodiments of the present invention and are non-limitative.

EXAMPLES

1. Analytical Methods

In the following, measurement methods implemented in the examples are described.
Solids Content
The suspension solids content (also known as "dry weight") was determined using a Moisture Analyser MJ33 (Mettler-Toledo, Switzerland), with the following settings: drying temperature of 150° C., automatic switch off if the mass does not change more than 1 mg over a period of 30 sec, standard drying of 5 to 20 g of suspension.

Particle Size Distribution of a Particulate Material

Volume determined median particle size $d_{50}$ (vol) and the volume determined top cut particle size $d_{98}$ (vol) was evaluated using a Malvern Mastersizer 2000 Laser Diffraction System (Malvern Instruments Plc., Great Britain). The $d_{50}$ (vol) or $d_{98}$ (vol) value indicates a diameter value such that 50% or 98% by volume, respectively, of the particles have a diameter of less than this value. The raw data obtained by the measurement was analyzed using the Mie theory, with a particle refractive index of 1.57 and an absorption index of 0.005. The methods and instruments are known to the skilled person and are commonly used to determine particle size distributions of fillers and pigments.

The weight determined median particle size $d_{50}$ (wt) was measured by the sedimentation method, which is an analysis of sedimentation behaviour in a gravimetric field. The measurement was made with a Sedigraph™ 5100 or 5120 of Micromeritics Instrument Corporation, USA. The method and the instrument are known to the skilled person and are commonly used to determine particle size distributions of fillers and pigments. The measurement was carried out in an aqueous solution of 0.1 wt.-% $Na_4P_2O_7$. The samples were dispersed using a high speed stirrer and supersonicated.
Porosimetry The specific pore volume was measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~nm). The equilibration time used at each pressure step is 20 seconds. The sample material is sealed in a 3 cm³ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bi modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution. By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

BET Specific Surface Area (SSA) of a Material

The specific surface area (in m²/g) of the filler material was determined using the BET method (using nitrogen as adsorbing gas according to ISO 9277:2010. The total surface area (in m²) of the filler material was then obtained by multiplication of the specific surface area and the mass (in g) of the filler material prior to treatment.

X-Ray Diffraction (XRD)

XRD experiments were performed on the samples using rotatable PMMA holder rings. Samples were analysed with a Bruker D8 Advance powder diffractometer obeying Bragg's law. This diffractometer consists of a 2.2 kW X-ray tube, a sample holder, a ϑ-ϑ-goniometer, and a VÅNTEC-1 detector. Nickel-filtered Cu Kα radiation is employed in all experiments. The profiles were chart recorded automatically using a scan speed of 0.7° per min in 2ϑ. The resulting powder diffraction pattern can easily be classified by mineral content using the DIFFRACsuite software packages EVA and SEARCH, based on reference patterns of the ICDD PDF 2 database. Quantitative analysis of diffraction data refers to the determination of amounts of different phases in a multi-phase sample and has been performed using the DIFFRACsuite software package TOPAS. In detail, quantitative analysis allows to determine structural characteristics and phase proportions with quantifiable numerical precision from the experimental data itself. This involves modelling the full diffraction pattern (Rietveld approach) such that the calculated pattern(s) duplicates the experimental one. The Rietveld method requires knowledge of the approximate crystal structure of all phases of interest in the pattern. However, the use of the whole pattern rather than a few select lines produces accuracy and precision much better than any single-peak-intensity based method.

2. Example

Samples X1 to X24, defined in Table 1, were prepared according to the following method:

500 ml of an aqueous suspension of ground calcium carbonate were prepared in a mixing vessel by adjusting the solids content of a ground marble calcium carbonate from Hustadmarmor A/S, Norway, having a mass based particle size distribution of 90% less than 2 μm, as determined by sedimentation, such that a solids content of 10 wt.-%, based on the total weight of the aqueous suspension, is obtained. This slurry was heated to 70° C.+/−3° C. and this temperature was maintained throughout the experiment.

In addition, a first solution was prepared containing 30 wt.-% phosphoric acid, based on the total weight of the first solution, as well as a second solution containing 20 wt.-% of one or two organic acid(s), based on the total weight of the second solution, as defined in Table 1.

Whilst mixing the calcium carbonate suspension, 89 g of the first solution containing phosphoric acid was added to said suspension over a period of 10 min. Whilst dosing in the phosphoric acid, the second solution containing the organic acid(s) was added over a time of approximately 20 s at t=Y, where Y is defined in Table 1, and where t=0 to t=10 min is the time of phosphoric acid addition, i.e. $\Delta t_P$=10 min. Where "Mixed in $H_3PO_4$" is written for Y, the organic acid was blended into the phosphoric acid prior to its addition.

Finally, after the addition of the phosphoric acid, the slurry was stirred for an additional 5 min, before removing it from the vessel and drying.

The results of the measurements are compiled in Table 1 and 2.

TABLE 1

Effect of organic acids on BET values.

| Sample | Organic acid | Add Time (Y) [min] | BET [m²g⁻¹] |
| --- | --- | --- | --- |
| X1 (comparative) | —* | — | 54.3 |
| X2 (comparative) | —* | — | 51.2 |
| X3 (comparative) | Lactic acid | t = 2 | 50.7 |
| X4 (comparative) | Fumaric acid | t = 2 | 52.3 |
| X5 (comparative) | Suberic acid | t = 2 | 55 |
| X6 (comparative) | Adipic acid | t = 2 | 59.1 |
| X7 (comparative) | Succinic acid | t = 2 | 59.7 |
| X8 | Maleic acid | t = 2 | 68.9 |
| X9 | Malonic acid | Mixed in $H_3PO_4$ | 64.0 |
| X10 | Malonic acid | t = 0 | 99.6 |
| X11 | Malonic acid | t = 2 | 88.0 |
| X12 | Malonic acid | t = 5 | 63.3 |
| X13 | Malic acid | Mixed in $H_3PO_4$ | 83.2 |
| X14 | Malic acid | t = 0 | 119.4 |
| X15 | Malic acid | t = 2 | 110.8 |
| X16 | Malic acid | t = 5 | 78.0 |
| X17 | Tartaric acid | Mixed in $H_3PO_4$ | 127.0 |
| X18 | Tartaric acid | t = 0 | 158.2 |
| X19 | Tartaric acid | t = 2 | 142.3 |
| X20 | Tartaric acid | t = 5 | 114.4 |

*= no organic acids were added.

The measurement results presented in Table 1 show that only the inventive dicarboxylic acids falling under structural formula (I) lead to a noticeable increase on the BET values; i.e. adipic acid, succinic acid, maleic acid, malic acid and tartaric acid as compared to the products obtained using $H_3PO_4$ only (samples X1, BET=54.3 m²g⁻¹, or X2, BET=51.2 m²g⁻¹), lactic acid (sample X3, BET=50.7 m²g⁻¹), fumaric acid (sample X4, BET=52.3 m²g⁻¹) or suberic acid (sample X5, BET=55 m²g⁻¹). It can also be seen from said experimental data that the increase of the BET can be controlled by the selection of a specific dicarboxylic acid.

TABLE 2

Effect of the addition time of selected dicarboxylic acids of formula (I) on the BET values.

| | Organic acid | Sample | BET [m²g⁻¹] |
| --- | --- | --- | --- |
| 1) No organic acid (comparative) | — | X2 | 51.2 |
| 2) Mixed in $H_3PO_4$ | Malonic acid | X9 | 64.0 |
| | Malic acid | X13 | 83.2 |
| | Tartaric acid | X17 | 127.0 |
| 3) t = 0 | Malonic acid | X10 | 99.6 |
| | Malic acid | X14 | 119.4 |
| | Tartaric acid | X18 | 158.2 |
| 4) t = 2 | Malonic acid | X11 | 88.0 |
| | Malic acid | X15 | 110.8 |
| | Tartaric acid | X19 | 142.3 |
| 5) t = 5 | Malonic acid | X12 | 63.3 |
| | Malic acid | X16 | 78.0 |
| | Tartaric acid | X20 | 114.2 |

Figure 1:
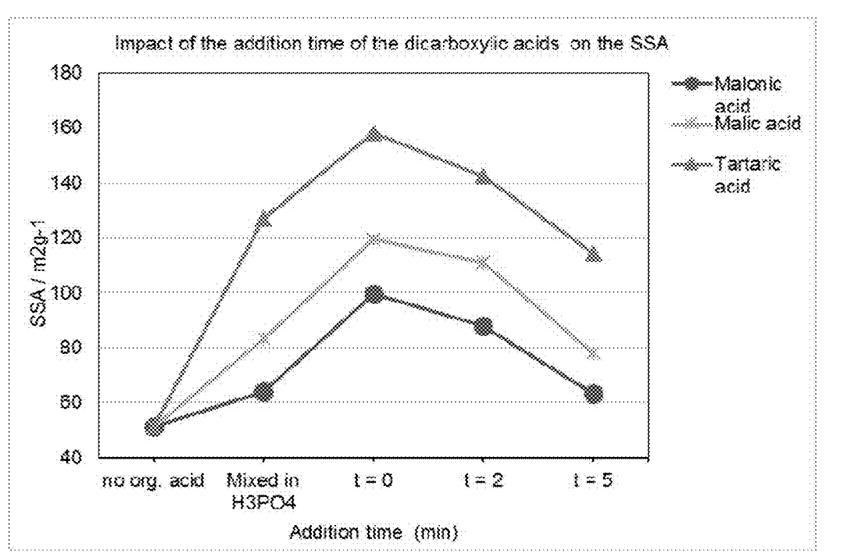
FIG. 1 is a graphical description of the impact of the addition time of dicarboxilic acids on SSA.

The results shown in Table 2 are also visualized in FIG. 1. As can be gathered from said FIGURE, the BET of the obtained surface-reacted calcium carbonate can be further increased by adding the phosphoric acid and the dicarboxylic acid in separate streams between t=0 min and before t=5 min, i.e. between the beginning of the phosphoric addition time period $\Delta t_P$ at $t_0$ and before 50% of the phosphoric acid addition time period $\Delta t_P$ has elapsed.

The invention claimed is:

1. Process for producing a surface-reacted calcium carbonate comprising the steps of:
   a) providing an aqueous suspension of calcium carbonate comprising material, b) providing phosphoric acid,
c) providing at least one dicarboxylic acid of structural formula (I) or a corresponding salt thereof (I)

wherein
n is 1, 2 or 3, and
X is —$CH_2$—, —$CHR^a$—, —$CR^aR^b$—, or —$CR^a$=$CR^b$ (cis)-,
wherein $R^a$ and $R^b$ are independently selected from the group consisting of H, OH, $OR^c$, —$CH_3$, —$CH_2CH_3$, —$CH_2CH_2CH_3$, —$CH(CH_3)2$, tBu, secBu, and nBu, and wherein $R^c$ is Li, Na, or K, and
d) adding the phosphoric acid of step b) to the calcium carbonate-comprising material of step a) over a phosphoric acid addition time period $\Delta t_P$ in the presence of carbon dioxide to form an aqueous suspension of surface-reacted calcium carbonate,
wherein the carbon dioxide is formed in-situ by the addition of phosphoric acid and/or is supplied from an external source, and
wherein the at least one dicarboxylic acid of step c) or a corresponding salt thereof is added in step d) during the phosphoric acid addition time period $\Delta t_P$.

2. The process of claim 1, wherein in step c) the at least one dicarboxylic acid of structural formula (I) is provided.

3. The process of claim 1, wherein $R^a$ and $R^b$ are included in X and are independently selected from the group consisting of H and OH.

4. The process of claim 1, wherein the process further comprises a step e) of separating the surface-reacted calcium carbonate from the aqueous suspension obtained in step d), and optionally a step f) of drying the surface-reacted calcium carbonate.

5. The process of claim 1, wherein the calcium carbonate comprising material is a natural ground calcium carbonate and/or a precipitated calcium carbonate.

6. The process of claim 5, wherein the natural ground calcium carbonate is selected from the group consisting of marble, chalk, limestone, and mixtures thereof, and/or the precipitated calcium carbonate is selected from the group consisting of precipitated calcium carbonates having an aragonitic, vateritic or calcitic crystal form, and mixtures thereof.

7. The process of claim 1, wherein the calcium carbonate comprising material is in form of particles having a weight median particle size $d_{50}$ (wt) from 0.05 to 10 μm.

8. The process of claim 7, wherein the calcium carbonate comprising material is in form of particles having a weight median particle size $d_{50}$ (wt) from 0.6 to 1.2 μm, and/or a weight top cut particle size $d_{98}$ (wt) from 3 to 7 μm.

9. The process of claim 1, wherein the phosphoric acid is provided in an amount from 1 to 60 wt.-%, based on the total weight of the calcium carbonate-comprising material.

10. The process of claim 9, wherein the phosphoric acid is provided in an amount from 20 to 50 wt.-%, based on the total weight of the calcium carbonate-comprising material.

11. The process of claim 1, wherein the at least one carboxylic acid of structural formula (I) is selected from the group consisting of maleic acid, malonic acid, malic acid, tartaric acid, optionally substituted with one or more methyl and/or ethyl groups, and mixtures thereof.

12. The process of claim 11, wherein the at least one carboxylic acid of structural formula (I) is selected from the group consisting of malic acid and/or tartaric acid.

13. The process of claim 1, wherein the at least one dicarboxylic acid or a corresponding salt thereof is provided in an amount from 0.1 to 50 wt.-%, based on the total weight of the calcium carbonate-comprising material.

14. The process of claim 13, wherein the at least one dicarboxylic acid or a corresponding salt thereof is provided in an amount from 1 to 5 wt.-%, based on the total weight of the calcium carbonate-comprising material.

15. The process of claim 1, wherein the at least one dicarboxylic acid or a corresponding salt thereof is provided in an amount from 1 to 25 wt.-% based on the total weight of the phosphoric acid.

16. The process of claim 15, wherein the at least one dicarboxylic acid or a corresponding salt thereof is provided in an amount from 9 to 11 wt.-% based on the total weight of the phosphoric acid.

17. The process of claim 1, wherein the at least one dicarboxylic acid or a corresponding salt thereof is added between the beginning of the phosphoric acid addition time period $\Delta t_P$, at $t_0$ and before 60% of the phosphoric acid addition time period $\Delta t_P$, has elapsed.

18. The process of claim 17, wherein the at least one dicarboxylic acid or a corresponding salt thereof is added between the beginning of the phosphoric acid addition time period $\Delta t_P$, at $t_0$ and before 10% of the phosphoric acid addition time period $\Delta t_P$, has elapsed.

19. The process of claim 1, wherein the at least one dicarboxylic acid or a corresponding salt thereof is added over a dicarboxylic acid addition time period $\Delta t_{DA}$ and $\Delta t_{DA}$ is from 1 to 20% of the total phosphoric acid addition time period $\Delta t_P$.

20. The process of claim 19, wherein the at least one dicarboxylic acid or a corresponding salt thereof is added over a dicarboxylic acid addition time period $\Delta t_{DA}$ and $\Delta t_{DA}$ is from 3 to 10% of the total phosphoric acid addition time period $\Delta t_P$.

21. The process of claim 1, wherein step d) is carried out at a temperature from 20 to 90° C.

22. The process of claim 21, wherein step d) is carried out at a temperature from 60 to 70° C.

23. The process of claim 1, wherein an additional dicarboxylic acid is added during step d.

24. The process of claim 23, wherein an additional dicarboxylic acid is added during step d) together with the at least one dicarboxylic acid or a corresponding salt thereof.

25. The process of claim 1, wherein the phosphoric acid and the at least one weak dicarboxylic acid or a corresponding salt thereof are added together in step d) in form of mixture, or the phosphoric acid and the at least one dicarboxylic acid or a corresponding salt thereof are added in step d) simultaneously in form of separate streams.

* * * * *